United States Patent Office 3,358,001
Patented Dec. 12, 1967

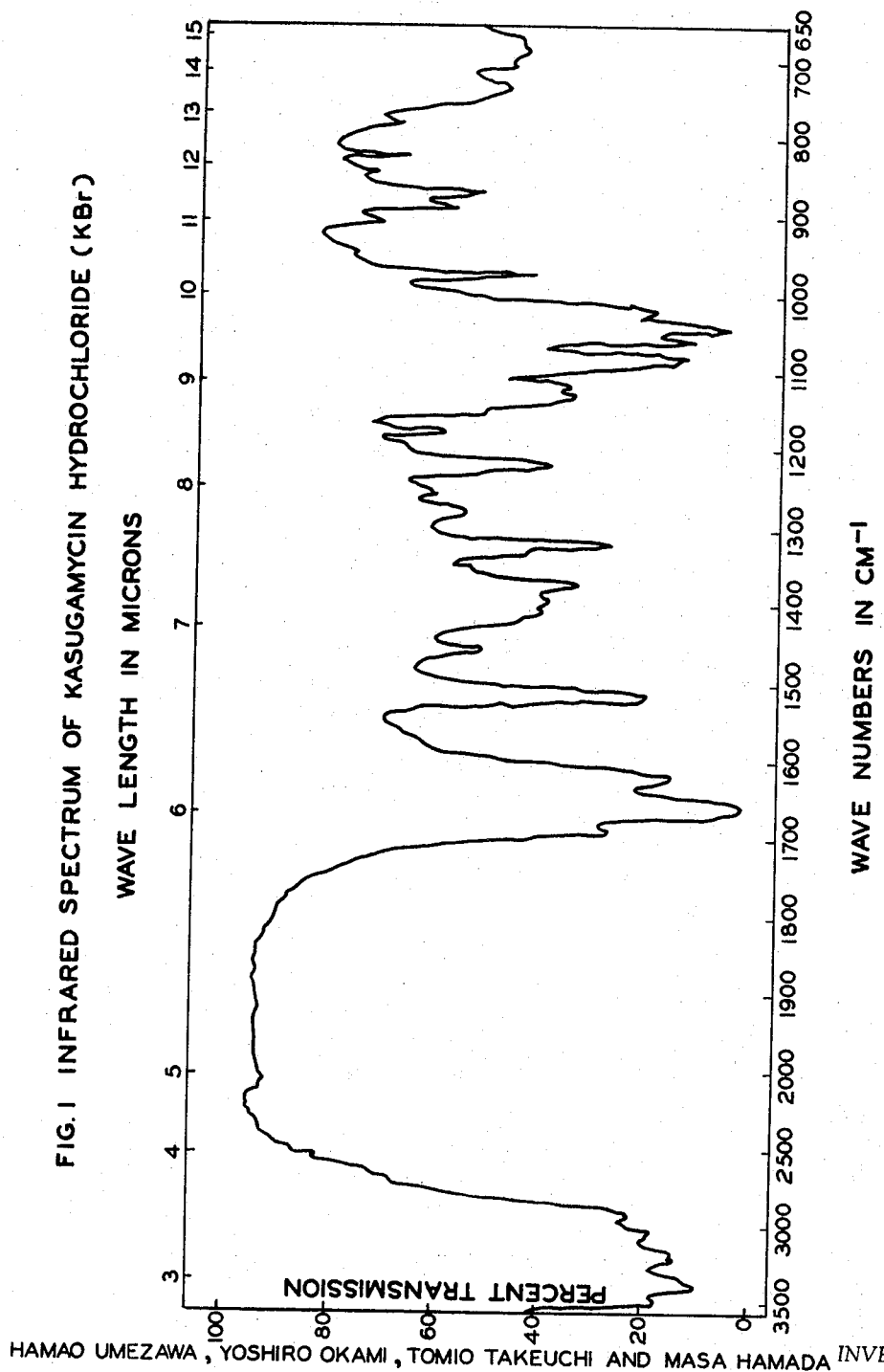
FIG.1 INFRARED SPECTRUM OF KASUGAMYCIN HYDROCHLORIDE (KBr)

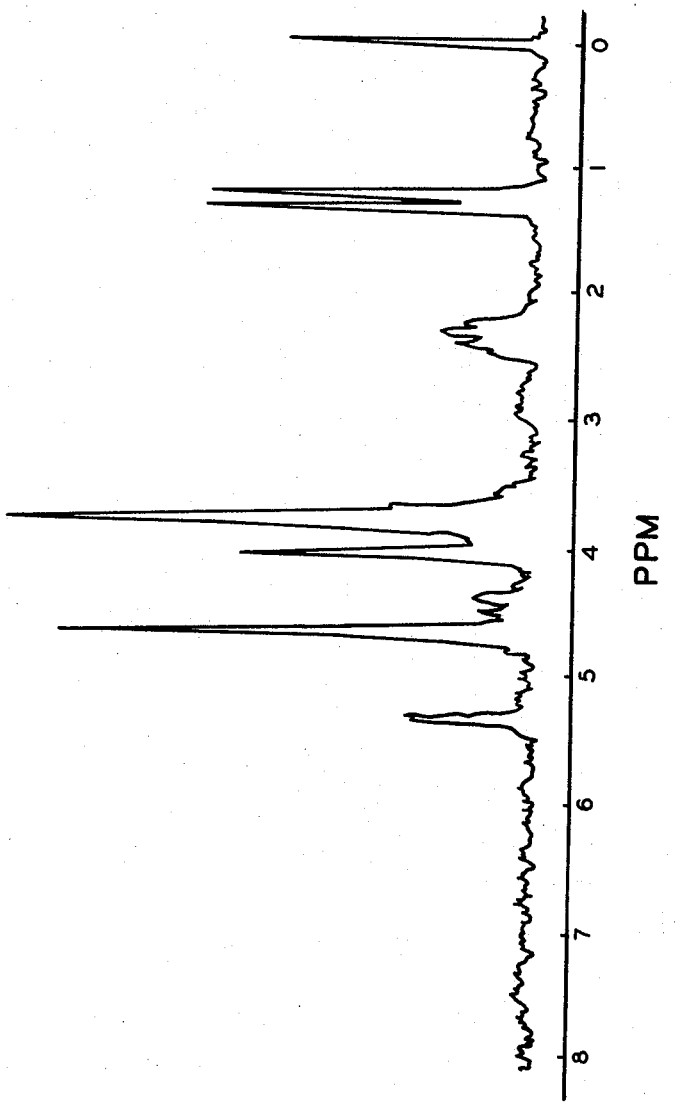

3,358,001
ANTIBIOTIC KASUGAMYCIN
Hamao Umezawa, 23 Kita 2-chome, Nerima-ku; Yoshiro Okami, 18–3 6-chome, Denenchofu, Ohta-ku; Tomio Takeuchi, 273 Imaizumicho, Ota-ku; and Masa Hamada, Higashi-Fushimi-Kodan-Jutaku, 3–4 947 Kami-Hoya, Hoya-cho, Kitatama-gun, all of Tokyo, Japan
Filed Aug. 31, 1966, Ser. No. 576,455
Claims priority, application Japan, Dec. 28, 1963, 38/70,718; Apr. 19, 1964, 39/19,767
11 Claims. (Cl. 260—345.7)

This application is a continuation-in-part of our prior, co-pending application Ser. No. 412,168 filed Nov. 18, 1964 now abandoned.

This invention relates to a new and useful antibiotic substance called kasugamycin, and to its production. More particularly, it relates to processes for its production by fermentation and methods for its recovery and purification. This invention embraces this antimicrobial agent and its acid addition salts in dilute solutions, as crude concentrates, as crude solids, as purified solids and in pure crystalline forms. This substance is effective in inhibiting the growth of Pseudomonas, Salmonella, Shigella, Brucella, and some Klebsiella. This substance is nontoxic and exhibits a therapeutic effect on infections of Pseudomonas and other sensitive organisms in mice. This substance is useful in the cure of infections of Pseudomonas and other sensitive organisms. In addition, this substance is effective in inhibiting the growth of *Piricularia oryzae* which causes a dreadful disease of rice plants. This substance is nontoxic to plants and exhibits a preventive effect on infections of *Piricularia oryzae* on rice plants. This substance is also useful for prevention of the rice plant disease.

There is now provided, according to the present invention, an antibiotic substance (and its acid addition salts and especially its nontoxic, pharmaceutically acceptable acid addition salts) effective in inhibiting Pseudomonaceae, Salmonella, Shigella, Brucella and some Klebsiella and Blastmyces, said antibiotic substance being soluble in water, substantially insoluble in methanol, ethanol, acetone, ethyl acetate, ether, chloroform and benzene, exhibiting no absorption of ultraviolet light from 220 m$\mu$ to 400 m$\mu$, giving a positive reaction to ninhydrin reagent in pyridine, giving a negative reaction in Sakaguchi, Molisch, Elson-Morgan, Fehling, Tollens and ferric chloride reactions, giving a crystalline hydrochloride which exhibits characteristic absorption bands in the infrared region of the spectrum when pelleted with potassium bromide at the following wave numbers in cm.$^{-1}$: 3520, 3350, 3200, 3070, 2950, 2050, 1695, 1670, 1625, 1522, 1462, 1379, 1323, 1286, 1224, 1180, 1135, 1120, 1090, 1080, 1060, 1042, 1025, 975, 945, 908, 890, 870, 846, 825, 783, 709, which exhibits dextrorotation of $[\alpha]_D^{25}$ +120° (C 1.6, H$_2$O), which has the empirical formula $C_{14}H_{25}O_9N_3 \cdot HCl \cdot H_2O$ and the structural formula

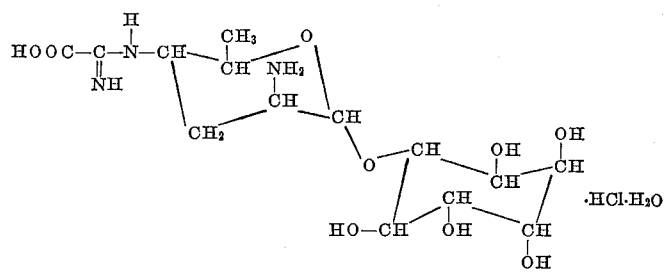

which melts at 236–239° C. with decomposition, the titration of which shows pKa' <2, 7.1, 10.6 and an equivalent weight of about 453; further properties of said kasugamycin being that kasugamycin forms crystalline salts with hydrobromic acid, sulfuric acid, etc., that acid hydrolysis of kasugamycin yields (+)-inositol, methanolysis yields the residual part in the methylated form, and hydrolysis with baryta yields $C_{14}H_{26}O_{10}N_2 \cdot H_2O$ which is further hydrolyzed to $C_{12}H_{26}O_7N_2$ and oxalic acid.

There is also included within the scope of the present invention the tautomeric form of kasugamycin having the formula

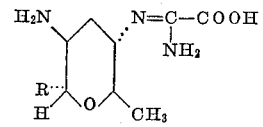

wherein R represents d-inositol.

Referring to the drawings:

FIG. 1 is the infrared absorption spectrum of kasugamycin hydrochloride pelleted in potassium bromide. FIG. 2 is the nuclear magnetic resonance spectrum taken in D$_2$O using sodium salt of 3-(trimethylsilyl)propanesulfonic acid as the standard. There is further provided according to the present invention the process for the production of the antibiotic kasugamycin which comprises cultivating a strain of *S. kasugaensis* in an aqueous carbohydrate solution containing a nitrogenous material under aerobic conditions until a substantial amount of kasugamycin is accumulated in said solution.

Kasugamycin is a new antibiotic discovered by the present inventors. The organism producing the antibiotic of the present invention was first found by the present inventors and was isolated from a sample of soil collected at Kasuga Shrine, Nara City, Japan and is a new species, designated *Streptomyces kasugaensis*, of the genus Streptomyces. A culture given the laboratory designation M338–M1 has been deposited in the American Type Culture Collection, Washington, D.C., and added to its permanent collection of microorganisms as A.T.C.C. 15714.

*Streptomyces kasugaensis* has the following characteristics:

(1) Microscopic observation: Substrate mycelia branch finely and produce long aerial mycelium, the tips of which partly appear to be loop or spiral with formation of spore chains. No whorl was observed. Under the electron-microscope, the surface of spores is smooth without spiny or hairy structure.

(2) On glycerol Czapek agar plate (glycerol nitrate agar), incubated at 27° C.: Cream to olive gray or yellowish brown colored growth. Scant white aerial mycelium. Pale olive or pale yellowish brown pigment in the medium.

(3) On Krainsky glucose asparagine agar plate, incubated at 27° C.: Growth with cream to light brownish color or with reddish brown tinge. White to light olive or olive gray aerial mycelium. Dark yellowish or dark yellowish brown colored pigment in the medium.

(4) On calcium malate agar plate, incubated at 27° C.: Growth with ivory yellow color. White to sandy colored aerial mycelium. No soluble pigment. Calcium malate around the growth is usually dissolved and becomes transparent, but in case of the poor growth, this characteristic is not observed.

(5) On starch agar plate, incubated at 27° C.: Ivory yellow colored growth. White aerial mycelium. No soluble pigment. Hydrolytic activity is none or very weak.

(6) In peptone solution containing 0.2% of NaNO₃, incubated at 37° C.: Colorless growth on the surface. No aerial mycelium. No soluble pigment. Nitrate is reduced.

(7) On nutrient agar slant, incubated at 37° C.: Growth with cream to pale yellowish brown color or with reddish brown color. Aerial mycelium is hardly produced. No soluble pigment.

(8) In skimmed milk, 37° C.: Colorless growth with no aerial mycelium. Usually, coagulation or peptonization is not observed but occasionally weak coagulation and peptonization are observed. No soluble pigment.

(9) Gelatin stab culture, incubated at 18–20° C.: Colorless, occasionally reddish brown colored growth. Pale brownish soluble pigment. Liquefaction of gelatin is observed occasionally.

(10) Utilization of carbon sources for growth on Pridham-Gottlieb's basal medium, incubated at 27° C.: Glucose, fructose, galactose, mannose, inositol, maltose and raffinose are utilized, giving abundant growth. Rhamnose, sorbitol, salicin, dulcitol, sucrose and inulin are poorly utilized. Arabinose, lactose, dextrin and starch are hardly utilized.

(11) Production of the antibiotic, kasugamycin:

The characteristics of the strain No. M338–M1 may be summarized as follows: It belongs to genus Streptomyces having long aerial mycelium tips of which are in loop or spiral shape. The surface of spores is smooth. Protoelytic activity is weak. The aerial mycelium is white to olive gray and the growth is cream to pale yellowish brown color or reddish brown color. It is not chromogenic type. It produces kasugamycin.

Comparing with known species of streptomyces, *Streptomyces galbus* and *Streptomyces fulvissimus* are found to be related to the strain No. M338–M1. However, *S. galvus* has hairy structure on the surface of spores and *S. fulvissimus* produces golden yellow soluble pigment and exhibits strong proteolytic action. The strain M338–M1 when isolated from the soil produced also the other antibiotics aureothricin and thiolutin. Therefore, the strain M338–M1 must be compared with *Streptomyces thioluteus*, *Streptomyces celluloflavus* and *Streptomyces cyanoflavus*. *Streptomyces thioluteus* forms whorl. *S. celluloflavus* produces yellowish green pigment and exhibits strong proteolytic action. *S. cyanoflavus* does not form spiral, produces greenish blue pigment, and exhibits strong proteolytic action. In these points, the strain M338–M1 can be distinguished from these species. In addition, the strain M338–M1 is different from these species in respect to their sensitivities against various antibiotics.

The above characterstics are sufficient to distinguish the microorganism from the hitherto described species of Streptomyces and to show that the strain M338–M1 belongs to a novel species. Variation and mutation of the above described organism is naturally expected since such is a common property of anactinomyces. *Streptomyces kasugaensis* includes the typical strain described above, and all natural and artificial variants and mutants thereof. That is, by definition the *Streptomyces Kasugaensis* of the present invention includes all strains producing kasugamycin except those which produce kasugamycin and which can be absolutely differentiated therefrom. For an example, a streptomyces producing aureothricin, thiolutin and kasugamycin should be comprised in *Streptomyces kasugaensis* in this invention unless it is distiguished absolutely from the strain No. M338–M1 and its expectable variants and mutants.

Mutants of the strain No. M338–M1 having increased intensity of yellowish color have been obtained after monspore selection of the strain M338–M1 and mutants having reddish purple color or reddish color have been obtained when each individual colony was separated after ultraviolet irradiation. Mutants which do not produce aureothricin and thiolution but do produce kasugamycin have been obtained from the strain M338–M1 which originally produced aureothricin and thiolutin as well as kasugamycin.

In an example using a basal medium consisting of soybean meal, 1.5%; K₂HPO₄, 0.1%; MgSO₄·7H₂O, 0.05% and NaCl, 0.3%, the following production of kasugamycin was observed with the following cultures obtained as indicated: the mutant No. M1 resembling the original soil isolate: 504 γ/cc. in a medium with glucose 1.0% on the sixth day (Um 8.0); 390 γ/cc. with glucose 1.0% and CaCO₃ 0.35% on the sixth day (pH 8.0); 468 γ/cc. with maltose 1.5% on the fifth day (pH 7.2); 666 γ/cc. with maltose 1.5% and CaCO₃ 0.35% on the fifth day (pH 7.4). The letter gamma means micrograms (mcg.).

A reddish mutant No. U2 obtained after the ultraviolet irradiation: 324 mcg./cc. in a medium added with glucose 1.5% on the sixth day (pH 8.0); 558 mcg./cc. with glucose 1.5% and CaCO₃ 0.35% on the fifth day (pH 6.4); 684 mcg./cc. with maltose 1.5% on the fourth day (pH 6.4); 540 mcg./cc. with maltose 1.5% and CaCO₃ 0.35% on the fifth day (pH 7.4). This mutant had the laboratory number M338–M1–U2 and has been deposited in the American Type Culture Collection, Washington, D.C. and added to its permanent collection of microorganisms as A.T.C.C. 15715.

Aureothricin and thiolutin are often produced simultaneously with kasugamycin. However, the amounts so produced varied depending on strains and media employed. For instance, some of the strains obtained after ultraviolet irradiation produced kasugamycin but not any aureothricin and thiolutin.

*S. kasugaensis* when grown under suitable conditions produces kasugamycin. A fermentation broth containing kasugamycin is prepared by inoculating spores or mycelia of the kasugamycin-producing organism into a suitable medium and then cultivating under aerobic condition. For the production of kasugamycin cultivation on a solid medium is possible, but for production of large quantities cultivation in a liquid medium is preferred. Any fermentation temperature can be employed within the range in which the kasugamycin-producing organism can grow and produce kasugamycin, although 25–35° C. is preferred. Media consisting of known kinds of nutritional sources for actinomycetes are useful for the production of kasugamycin. For example, commercial products such as peptone, meat extract, corn steep liquor, cottonseed flour, peanut flour, soybean flour, yeast extract, N–Z amine, casein, sodium nitrate, ammonium nitrate, ammonium sulfate and other nitrogenous materials such as wheat bran, rice bran, etc. are useful as the nitrogen source. The commercially available products, such as lactose, glycerol, sucrose, starch, glucose, maltose, molasses and other carbohydrates or fats in pure or crude state are useful as the carbon source. Pure or crude maltose, or starch hydrolyzed to maltose is one of carbon sources preferred for production of kasugamycin. Sodium chloride, sodium or potassium phosphate, calcium carbonate or magnesium sulfate can be also added. Traces of metal salts can be added, if necessary. Any kinds of constituents which can be utilized by kasugamycin-producing organisms for the production of kasugamycin are useful. Any materials employed in the cultivation of actinomycetes, such as the materials described in U.S. Patent No. 2,931,798, are useful.

The fermentation is continued until kasugamycin is substantially accumulated. For example, spores and mycelia on the slant culture of *Streptomyces kasugaensis* were inoculated into a medium consisting of glucose 2%, soybean meal 1.5%, K₂HPO₄ 0.1%, MgSO₄·7H₂O 0.05% and NaCl 0.3%, adjusted to pH 7.0 and shake cultured aerobically at 27° C. Then the accumulation of kasugamycin was observed in 3-5 days. In this case, aureothricin, thiolutin and polyene antifungal substance were produced simultaneously. Kasugamycin in the broth is very poorly transferred from the broth to organic solvents such as butanol, butyl acetate, ethyl acetate etc., while aureothricin, thiolutin and polyene antibiotics are transferred to organic solvents, especially to butanol. On the basis of this property, kasugamycin in the broth can be separated from the other antibiotics in the broth.

EXPERIMENTAL METHODS (1) Assay of kasugamycin:

(a) A hundred grams of green leaves or straws of rice plant are cut to small pieces and added to one liter of water. After boiling for 30 minutes, the mixture is filtered through 4 layers of gauze ad the filtrate is made up to one liter with water. To this solution, sucrose and agar are added to give final concentrations of 5% and 2.2% respectively. The solution is then autoclaved for 20 minutes at 120° C. Buffer solution of pH 3.5 consisting of M/15 $Na_2HPO_4$ and M/15 HCl (or M/10 iitric acid and M/5 sodium phosphate mixed at the ratio of 24.3:25.7 to make pH 5.0) is sterilized. The above medium and the buffer solution are mixed at the ratio of 1:1, and the mixture (10 cc.) is solidified in a Petri plate (10 cm. diameter). Spores of *Piricularia oryzae* are suspended in this medium, and its 4 ml. is overlayed. As usually done in antibiotic assay, cylinders are placed on this seeded agar medium and filled with a sample or a standard solution. The pH of the sample solution is adjusted to that of the medium. The plate is incubated for 48 hours at 27° C. The diameter of the inhibition zone around each cylinder is measured. Kasugamycin hydrochloride of 30 mcg./cc. exhibits an inhibition zone of about 30 mm. in diameter. If aureothricin, thiolutin or polyene substance is contained in the sample solution, the determination is made after extraction of those antibiotics by butanol at pH 2.0 of a medium consisting of glucose 0.5%; peptone (polypeptone) 0.5% and agar 2.0% (pH 7.0) are plated in a Petri dish 9 cm. in diameter and overlayed with the seed layer made from 5 cc. of the same medium which was inoculated with the above cultured broth at the concentration of 0.5–1.0%. Discs (8 mm. diameter) containing a test sample are placed on the plate and incubated at 27° C. for 17–18 hours. The sample and the standard are diluted with phosphate buffer of pH 7.0. Kasugamycin usually shows about 18 mm. inhibition diameter at 400 mcg./cc.

(2) Shaking culture was conducted in flasks of 500 cc. volume containing 125 cc. of a medium at 27–29° C. and on a reciprocal shaking machine (amplitude of 8 cm. at 200 strokes/minute).

(3) Tank culture was made in a stainless steel tank of 30 liters containing 15 liters of media under aeration of 20 liters air per minute, with stirring of 600 r.p.m. When the 400-liter tank was used 180–200 liters medium was employed. The aeration was 200 l./m. and the stirring was 200 r.p.m.

(4) The seed for shaking culture and the tank culture was prepared as follows: A loopful inoculum from a slant culture of the strain No. M338–M1 or its subculture was inoculated into the medium (pH 7.0) consisting of glucose 1.5%, soybean flour 1.5%, $K_2HPO_4$ 0.1%, $MgSO_4 \cdot 7H_2O$ 0.05%, NaCl 0.3% and $CaCO_3$ 0.5% and shake-cultured at 27–29° C. for three days. The cultured broth thus obtained was used for the seed culture.

PRODUCTION OF KASUGAMYCIN BY FERMENTATION

For an example, when a basal medium consisting of soybean meal 1.5%, $K_2HPO_4$ 0.1%, $MgSO_4 \cdot 7H_2O$ 0.05% and NaCl 0.3% was added with various: carbon sources and was adjusted to pH 7.0, the following production was obtained by the shaking culture:

|  | Fermentation Days | | | | | |
|---|---|---|---|---|---|---|
|  | 1 | 2 | 3 | 4 | 5 | 6 |
| Maltose 1.5%, pH | 6.6 | 6.8 | 7.0 | 6.6 | 7.0 | 7.0 |
| Kasugamycin, mcg./cc | 0 | 216 | 763 | 1,037 | 1,224 | 1,224 |
| Reducing sugar, mg./cc | 20.0 | 18.5 | 12.0 | 10.2 | 8.6 | 8.4 |
| Maltose 1.5% and $CaCO_3$ 0.5%, pH | 6.4 | 6.8 | 7.0 | 6.6 | 7.0 | 7.2 |
| Kasugamycin, mcg./cc | 0 | 180 | 799 | 907 | 1,044 | 900 |
| Reducing sugar, mg./cc | 21.2 | 17.0 | 11.9 | 5.8 | 8.4 | 8.3 |
| Glucose 1.5% and $CaCO_3$ 0.5%, pH | 6.0 | 6.2 | 6.4 | 6.2 | 7.0 | 7.4 |
| Kasugamycin, mcg./cc | 0 | 117 | 547 | 576 | 410 | 396 |
| Reducing sugar, mg./cc | 15.7 | 15.4 | 6.7 | 2.6 | 6.0 | 4.4 |
| Soluble starch 1.0% and glucose 0.5%, pH | 6.0 | 6.8 | 8.0 | 8.0 | 8.4 | 8.8 |
| Kasugamycin, mcg./cc | 0 | 95 | 86 | 187 | 122 | 90 |
| Reducing sugar, mg./cc | 15.1 | 12.6 | 11.3 | 6.0 | 12.1 | 12.2 |
| Glycerol 1.0% and glucose 0.5%, pH | 5.6 | 5.2 | 6.8 | 6.8 | 7.6 | 8.4 |
| Kasugamycin mcg./cc | 0 | 54 | 112 | 241 | 130 | 85 |
| Reducing sugar mg./cc | 11.4 | 10.0 | 4.2 | 2.5 | 5.1 | 4.6 |
| Hydrolyzed starch 3.0%, pH | 6.0 | 6.4 | 7.0 | 7.0 | 7.2 | 7.4 |
| Kasugamycin, mcg./cc | 0 | 36 | 299 | 503 | 439 | 504 |
| Reducing sugar, mg./cc | 27.1 | 23.7 | 12.5 | 5.0 | 18.0 | 11.8 |

(b) *Pseudomonas tabaci* is inoculated to a slant consisting of sodium glutamate 0.2%; $K_2HPO_4$ 0.2%; $MgCl_2 \cdot 7H_2O$ 0.1%; sucrose, 2.0%; yeast extract, 0.2%; peptone (polypeptone), 0.5% and agar 1.2% (pH 6.8) and incubated at 27° C. for 24 hours. From this slant, one loopful inoculum is inoculated into a bouillon containing 1% glucose and incubated at 27° C. for 24 hours. Five cc. When media containing various nitrogen sources were tested, using the basal medium consisting of maltose, 1.5%; NaCl, 0.3%; $K_2HPO_4$, 0.1%; $MgSO_4 \cdot 7H_2O$, 0.1%; $CuSO_4 \cdot 5H_2O$, 0.0007%; $FeSO_4 \cdot 7H_2O$, 0.0001%; $\cdot 7H_2O$ 0.1%; sucrose, 2.0%; yeast extract, 0.2%; peptone $MuCl_2 \cdot 4H_2O$, 0.0008% and $ZnSO_4 \cdot 7H_2O$, 0.0002% (pH 7.0), the following results were obtained:

| Nitrogen Sources | Kasugamycin Present at Inidcated Time (days) | | | | | | | |
|---|---|---|---|---|---|---|---|---|
|  | 3 | | 4 | | 5 | | 6 | |
|  | pH | Mcg./cc. | pH | Mcg./cc. | pH | Mcg./cc. | pH | Mcg./cc. |
| Peptone 0.75%, meat extract 0.3% | 7.8 | 450 | 8.0 | 324 | 8.0 | 576 | 7.8 | 324 |
| Peptone 0.75%, yeast extract 0.3% | 6.8 | 252 | 6.8 | 324 | 6.4 | 360 | 5.6 | 396 |
| Casein hydrolysate 0.75%, meat extract 0.3% | 8.0 | 342 | 8.2 | 216 | 8.4 | 270 |  |  |
| Enzymatic digest of casein (N-Z Amine A) 0.75%, meat extract, 0.3% | 8.2 | 198 | 8.4 | 144 | 8.6 | 270 |  |  |
| Soybean meal 1.5% | 6.6 |  | 6.4 | 396 | 6.6 | 720 | 6.6 | 396 |
| Soybean meal 1.5% $(NH_4)_2SO_4$ 0.2% | 7.0 | 414 | 6.8 | 342 | 7.0 | 864 | 6.6 | 540 |
| Cottonseed meal 1.5% | 6.0 |  | 6.0 | 360 | 6.2 | 360 | 6.4 | 216 |
| Soybean meal 1.5%, meat extract 0.3% | 6.6 | 252 | 6.4 | 432 | 6.4 | 612 | 7.6 | 900 |

These results indicate that various nitrogenous materials are useful for the production of kasugamycin.

EXTRACTION AND PURIFICATION OF KASUGAMYCIN

There is provided according to the present invention processes for extraction and purification of kasugamycin and its acid addition salts. Kasugmycin, its hydrochloride and its sulfate are freely soluble in water and in the fermented broth kasugamycin mainly exists in the liquid part. Kasugamycin is substantially insoluble in butanol, ethyl acetate, ether, chloroform and benzene and treatment with these solvents can be utilized to remove some impurities, if necessary. For instance, if aureothricin and thiolutin exist, these substances are removed by extraction with these solvents. If a propylene antibiotic such as is often produced by mainly kinds of streptomyces is present it can be removed by extraction with butanol at acidic pH. Aureothricin group antibiotics and polyene antibiotics can be also removed by the adsorption process using an active carbon or an ion exchange resin.

When kasugamycin as an aqueous solution was heated at various pH's at 60° C. for one hour, 82.5% of the activity remained at pH 2.0, 99.0% at pH 5.0, 100% at pH 7.0 and 9.0. No degradation occurred after storage in 0.1 N HCl at room temperature for six hours, and 85% of the activity remained after storage in 0.1 N NaOH for six hours. Thus, kasugamycin is stable enough for distillation in vacuum, spary drying or other methods available for the concentration or drying of the fermented broth or aqueous solutions containing kasugamycin. The powder thus obtained by concentration and drying of the fermented broth can be employed for the prevention of rice blast. If necessary, this powder is washed with methanol, ethanol, acetone or butanol to remove impurities. With the absorbents, kasugamycin can be obtained from the fermented broth or from its aqueous solution. Active carbon is one of preferred absorbents. Kasugamycin absorbed on active carbon can be eluted efficiently by aqueous methanol, aqueous ethanol, aqueous acetone or water saturated with butanol, especially on the acidic side, as by hydrochloric acid.

On the basis of the weakly basis nature of kasugamycin, it can be absorbed on ion exchange resins. IR–120 (Resin Amberlite) having sulfonic acid radicals absorbs kasugamycin better than cation exchange Resin Amberlite IRC–50 having carboxylic acid radicals. Resin Amberlite IRC–50 is a commercially available cation exchange resin of the carboxylic type (U.S. Patent 2,340,111) it is a copolymer of methacrylic acid and divinyl benzene. Amberlite IR–120 is a commercially avilable cation exchange resin of the polysterene sulfonic acid type; it is thus a nuclear sulfonated polystyrene resin cross-linked with divinyl benzene obtained by the procedure given by Kunin, Ion Exchange Resins, 2nd Ed. (1958), John Wiley and Sons, Inc. Therein see pages 84 and 87 for example. Both are available from Rohm and Haas, Washington Square Philadelphia 5, Pa., U.S.A. The elution is made by acid aqueous solution or more efficiently by aqueous ammonia. When sulfuric acid resin is used in increased concentration of hydrochloric acid or sulfuric acid for instance, higher than 0.5 N, achieves good elution.

The stability of kasugamycin in aqueous ammonia at 37° C. is as follows: In 0.5 N ammonia, it was not destroyed at zero time, 45% of the activity remained after four hours and 15% after 18 hours; in 1.0 N ammonia, 95% remained at zero time, 25% after four hours and 5.0% after 18 hours; in 2.0 N ammonia, 76% remained at zero time and 12.5% after four hours; in 4.0 N ammonia, 55% remained at zero time and 5.0% after four hours. Therefore it is desirable to make elution with ammonia at as low temperature and at as low concentration of ammonia as possible. It is also desirable to adjust the pH of the eluate to neutrality as quickly as possible and then to concentrate in vacuo after adjustment of the pH. Kasugamycin is a kind of sugar in respect of its structure and it can be absorbed on anion exchange resins treated with boric acid and can be eluted with aqueous hydrochloric acid. Anion exchange resins of the OH type are useful agents for neutralizing the acid solution of kasugamycin. It behaves as a weak base. Adsorption of kasugamycin on cation exchange resin is lowered or inhibited by strongly basic impurities. Therefore, cation exchange resins are also utilized for removal of strong basic impurities, if necessary. A material containing kasugamycin and strongly basic impurities is passed through a column containing a suitable amount of IRC–50 of the Na or H type to remove strongly basic impurities and thereafter kasugamycin is adsorbed on IRC–120 resin from which it is eluted.

Centrifugation, filtration and other ordinary methods can be applied for removal of the myceilium mas from the fermented broth. The separation of mycelia becomes easier if the fermented broth is adjusted to acid pH and active carbon is added. The fermented broth is applied to an ion exchange resin column after removal of solid material including mycelium or it is first filtered through a screen which is fine enough to support the resin and this filtrate containing fine mycelium can be applied to the ion exchange resin tower.

The fermentation broth is adjusted to pH 2.0 and the active carbon is added to give final concentration of 0.5%. After sufficient stirring and filtration, the filtrate is adjusted to a pH 5.5–6.5. This filtrate is applied to a column which is charged with an amount of IRC–50 of H type insufficient for adsorbing kasugamycin. The pH of the passed solution is adjusted to 4.0 and that solution is applied to a column containing IR–120 resin (H type or ammonia type is preferred to Na type) to absorb kasugamycin. Then, the elution is made with aqueous ammonia and the eluate is neutralized. In this case, it is desirable to eluate at lower than 15° C. and to neutralize the eluate within five hours after the elution. The eluate is concentrated to dryness or freeze-dried to obtain kasugamycin as a crude powder. In another process, an active carbon is added to the broth filtrate. Kasugamycin absorbed is eluted with aqueous methanol containing hydrochloric acid and the eluate is concentrated and dried. The crude powder thus obtained can be further purified by the IR–120 procedure described above. In another method, the crude powder is dissolved in water and passed through a column of active carbon. After washing, the elution is made with hydrochloric acid (0.05 N, for an example), and the active fractions are neutralized by anion exchange resin. After the concentration in vacuo, 10–25 volumes of ethanol is added. It is kept at low temperature, then crystals of kasugamycin hydrochloride appear. The procedures described here are one of the preferred processes for extraction and purification of kasugamycin. As commonly experienced in the production of various antibiotics, the crystals can be obtained without the step of carbon-chromatography, if the concentration of kasugamycin in the broth is sufficiently increased. For instance, vacuum evaporation of the active eluate from IR–120 resin gives crystalline kasugamycin hydrochloride when the fermentation broth contains more than 500 mcg./cc. of kasugamycin. With sulfuric acid instead of hydrochloric acid, it is possible to obtain kasugamycin sulfate. As described later in the examples one of the preferable procedures for obtaining kasugamycin is that kasugamycin is adsorbed on a cation exchange resin directly from the fermented broth filtrate and is eluted.

Because of weakly basic nature of kasugamycin, it can be obtained as a precipitate from aqueous solutions with acidic and water-insoluble substances.

The properties of kasugamycin are here described. Kasugamycin is colorless and its hydrochloride is obtained as white crystals. The hydrochloride decomposes at 236–239° C. The hydrochloride is easily soluble in water, most insoluble in methanol and insoluble in ethanol, acetone, ethyl acetate, chloroform and benzene. The maximum solubility of crystals of the hydrochloride in water is about 1 g./8 cc. No maximum adsorption of ultraviolet light within a range of 220–400 m$\mu$. Its infrared spectrum is shown in FIGURE 1. The specific optical rotation, $[\alpha]_D^{25}$ is $+120°$ (1.6% in water), pKa' <2, 7.1, 10.6 The molecular weight is estimated to be 449 by the vapor pressure osmotic method and 453 by titration method. Kasugamycin ($C_{14}H_{25}O_9N_3 \cdot H_2O$) free base melts at 214°–216° C. with decomposition; $[\alpha]_D^{25} +115°$ (C.=1, $H_2O$).

The hydrobromide and the sulfate are water-soluble. The nuclear magnetic resonance spectrum of the hydrochloride taken in $D_2O$ solution, using sodium salt of 3-(trimethylsilyl)propanesulfonic acid as the standard and taken by Varian 60 instrument, is indicated in FIGURE 2, indicating bands at the following p.p.m.: 1.22, 1.32, 2.25, 2.33, 2.42, 2.50, 3.55, 3.79, 4.05, 4.38, 4.50, 4.70, 5.32, 5.35. The reactions of ninhydrin using pyridine and periodate permanganate are positive and the reactions of Seliwanoff, Sakaguchi, ferric chloride and Fehling are negative. It gives negative anthrone and Elson-Morgan reactions in usual conditions. Anthrone reaction gives reddish brown color after the treatment with nitrous acid. Under high voltage electrophoresis with

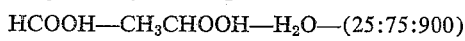

at pH 1.8, 3000 v./40 cm., 15–29ma./10 cm. and 10° C. and for 15 minutes, it moves 3.7 cm. to the anode. Rf value on a paperchromatogram using Toyo filter paper No. 519 and butanol-acetic acid-water (2:1:1) is 0.28, Rf on that using butanol-ethanol-water-ammonia (4:1:4.9:0.1) is 0.07, Rf on that using butanol-acetic acid-water (6.3:1:2.7) is 0.06.

On an agar medium of peptone and meat extract, kasugamycin inhibited *Corynebacterium xerosis* at 50 mcg./cc. *Sarcina lutea* (X strain) at 100 mcg./cc., a strain of *Klebsiella pneumoniae* at 50 mcg./cc., *Proteus vulgaris* (OX 19) at 100 mcg./cc., *Pseudomonas aeruginosa* at 100 mcg./cc., several strains of dysentery bacteria at 100 mcg./cc. and *Brucella melitensis* at 6.25 mcg./cc. while 100 mcg./cc. did not inhibit other kinds of bacteria tested. On the synthetic medium of Stephenson-Whetham, it exhibited stronger anti-bacterial activity than on the peptone-meat extract medium. In peptone solution, 6.25–25.0 mcg./cc. of kasugamycin inhibited 20 clinical isolates of Pseudomonas and 25.0–50.0 mcg./cc. inhibited 12 other isolates. The addition of serum did not decrease its antibacterial activity, while its activity against *S. typhi*, *S. paratyphi*, *K. pneumoniae*, Shigella was enhanced by serium. In 10% serum broth, *S. flexneri* and *K. pneumoniae* were inhibited at the concentration of 6.25 mcg./cc. On blood agar, Pneumococci were inhibited at 50–100 mcg./cc.

The toxicity is very low. Mice tolerated intravenous, subcutaneous or intraperitoneal injection of 1000 mg./kg. without any side effect. The monkey tolerated 800 mg./kg. of the intravenous injection. Daily administration of 2 g. by injection caused no side effects in man. It is orally adsorbed and daily 3 g. caused no toxic signs in man. It causes no irritation. Toxicity to fish is also low.

Killifish survived in water containing 100 mcg./cc. of kasugamycin Kasugamycin is promising as a chemotherapeutic agent against infections of bacteria including Pseudomonas. It has strong protective activity against rice blast without phytotoxicity. Although it does not inhibit *Piricularia oryzae* at 100 mcg./cc. in Sabouraud medium, it does inhibit at 0.1–1 mcg./cc. in the rice juice medium of acid pH. It is also effective in the pot test. The procedure of pot (flower-pot) tests was as follows: The leaves infected by rice blast and added to sterile water to prepare spore suspension of *Piricularia oryzae*. After sufficient shaking, this suspension is sprayed on the leaves after 2–3 leaves come out from each young rice plant which is grown by direct seeding of rice paddy of "Moko strain" in the pot. After the infective spray, the pot is kept in a damp greenhouse for 20–24 hours and then test samples are sprayed with test solutions. The pot is kept again in a greenhouse for 7 days and the disease spots on 10 leaves in three different pots are counted. In one experiment the kasugamycin spray at a concentration of 5 mcg./cc. decreased the number of diseased spots per 10 leaves down to 8, 20 mcg./cc. to 0.3 and 40 mcg./cc. to 0, while the control without application of kasugamycin gave 176 progressive disease spots. This curative effect was superior to that of blasticidin S. One hundred mcg./cc. of kasugamycin did not show any phytotoxicity to the rice plant. For the purpose of the protection against rice blast, it is not necessary to purify kasugamycin to a highly purified state. Even the culture liquid of a kasugamycin-producing organism or the powder obtained by drying such culture liquid can be used.

Blasticidin S has been known as an effective anti-rice blast antibiotic produced by an organism belonging to Actinomycetes. Blasticidin S is easily distinguished from kasugamycin by physico-chemical properties, antimicrobial action and toxicity. Blasticidin S is strongly toxic to animals and humans and is phytotoxic above 20 mcg./cc. Although kasugamycin is thought to be an aminosugar on the basis of its physico-chemical properties, it is distinguishable from trehalosamine by its molecular formula, antimicrobial activity and behavior in paper chromatography and it is also easily distinguished from hygromycin B and $B_2$ on the basis of its optical rotation and antimicrobial activity, etc. Kasugamycin shows special antimicrobial spectra under special conditions and there is no similar compound among known anibiotics. Acid hydrolysis of kasugamycin yields (+)-inositol. This is the first isolation of (+)-inositol from microbial products.

The following examples are intended to illustrate this invention; however, our invention should not be limited to the examples. Since the characteristics of kasugamycin are now clearly disclosed, it is easily possible to make various modifications of this invention. In the light of the foregoing disclosure, this invention covers the production of kasugamycin, its concentration, its extraction and its purification.

*Example 1*

A medium (180 liters) containing glucose 1.5%, soybean meal 1.2%, $K_2HPO_4$, 0.1%; $MgSO_4 \cdot 7H_2O$, 0.05%; NaCl, 0.3%; $CaCO_3$, 0.5% and silicon resin (Shinetsu Kagaku, KM–66) (40 cc.) was placed in a 400 l. stainless steel fermenter. The pH was adjusted to 6.6 after the sterilization. For antifoaming purposes, a container of 900 ml. soybean oil was installed inside the fermentor, and after 30 hours incubation, an additional 500 ml. of soybean oil were added. The culture conditions employed were as follows: agitation, 200 r.p.m.; air, 180 l./minute, incubation temp., 27° C. The pH after 24 hours incubation and every 6 hours thereafter up to 90 hours was 6.2, 5.4, 5.1, 5.2, 5.3, 5.8, 5.8, 5.9, 6.0, 5.7, 6.6 and 6.6, respectively. After 92 hours of the fermentation, the culture liquid was taken. Kasugamycin produced in this culture liquid exhibited inhibition diameter of 30 mm. by the assay method of (a), and the 128 times diluted solution was effective against rice blast in the pot test. This culture broth was centrifuged to separate mycelia and 310 l. of filtrate was obtained. The pH of the filtrate was adjusted to 7.0 and 12.5 kg. of active carbon was added. After stirring, carbon was filtered off by filter cloth and filter paper. The filtrate had only 5–10% of the activity of the culture filtrate. The solvent of 37.5 l. consisting of butanol and water (1:2) was added to the above carbon cake and the elution was made at 45° C. and at pH 2.0 with hydrochloric acid. It was repeated three times and the eluates were combined. This eluate (112.5 l.) was kept to stand and a water layer of 90 l. was concentrated in vacuo to 3.58 l. The concentrated solution was freeze-dried to brown powder (1,253 g.) having 1.8% purity of kasugamycin.

*Example 2*

The crude powder of 150 g. (1.8% purity) obtained in Example 1 was dissolved in two liters of distilled water and applied to a column of 100 cm. length and 5 cm. diameter which was filled with carbon for chromatographic use (the product of Wako Chemicals Co.). The flow rate was 3 cc./minute and it was kept at room temperature. The passed liquid did not show the existence of kasugamycin. The column of carbon was washed with 4 liters of distilled water and eluted with 0.05 N HCl. The first 1600 cc. fraction had pH 5.6 and did not contain kasugamycin. The next 3,000 cc. fraction had pH 1.0 and the following 200 cc. fraction had a pH of 1.0. They both contained kasugamycin. These active fractions were neutralized (by Dowex-3 ion exchange resin) and concentrated in vacuo to 10 cc. volume. To this, 200 cc. of ethanol were added and the mixture was kept overnight at 4° C. to produce a slightly yellowish white precipitate. After the filtration and drying of the precipitate, a white powder of 10.84 g. was obtained. The purity of this powder was 24.4%. The yield was calculated to be 97.8%.

*Example 3*

A powder which was obtained by the same procedure shown in Example 2 had a purity of 36%. 1.15 g. of this powder were dissolved in 150 cc. of distilled water and adjusted to pH 7.0. This was applied to a carbon column of 29 cm. length and 3 cm. diameter. It was kept at room temperature and the flow rate was 1 cc./minute. The column was washed with 350 cc. of distilled water. Then 0.02 N HCl was passed through it and the effluent was fractionated into 10 cc. portions. The beginning fraction of 520 cc. had pH 5.6 and did not contain kasugamycin. The next two fractions of 20 cc. had a pH of 4.0 and did not contain kasugamycin. The following 10 cc. had a pH of 2.0 and contained kasugamycin, but it was revealed to contain other ninhydrin positive substances by paper chromatography. The following 130 cc. had a pH below 1.0 and contained kasugamycin but it also contained other ninhydrin positive substances. The following 430 cc. had a pH below 1.0 and contained kasugamycin without any other ninhydrin-positive substances. This last fraction was neutralized (by Dowex-3) and concentrated in vacuo to 5 cc. volume. 100 cc. of ethanol were added to this concentrate and yielded a white powder of 301 mg. having 92% purity. (Yield was 66.8%.) This powder was recrystallized from water and yielded 120 mg. of crystalline kasugamycin hydrochloride.

*Example 4*

The medium consisting of maltose, 1.5%; soybean meal, 1.5%; $K_2HPO_4$, 0.1%; $MgSO_4 \cdot 7H_2O$, 0.05%; NaCl, 0.3% (pH 7.0) was inoculated with the Strain No. M338-M1 and shake-cultured. The broth of 3450 cc. containing kasugamycin was adjusted to pH 2.0 with 1 N HCl, filtered after adding diatomaceous earth and added with Hyflosuper cell (1%) and active carbon (0.5%). In this procedure it was revealed that kasugamycin was not practically adsorbed. The filtrate was adjusted to pH 7.0–7.4 and there was added active carbon at 2% to adsorb kasugamycin. The carbon cake which adsorbed kasugamycin was collected. In this case, the filtrate still contained kasugamycin about 10–23.5%. In the next step, 690 cc. of 80% methanol was added to the carbon cake and adjusted to pH 2.0 with 1 N HCl and the elution was made at 45° C. Then additional 350 cc. of 80% methanol were added and the elution was repeated. Two eluates were combined and the yield of kasugamycin in this eluate was calculated to be 62%. This methanolic eluate was adjusted to pH 4.0 with 1 N NaOH and concentrated in vacuo to yield a syrup. To the concentrate there was added ethanol until no further precipitation occurred. This precipitate contained kasugamycin and the supernatant contained only 5–10%. The precipitate was collected to obtain kasugamycin as a yellowish white powder having 5.3% purity. The yield from the original broth was calculated to be 45%.

*Example 5*

The powder of 5 g. having 1.8% purity obtained in Example 1 was dissolved in water of 500 cc. and adjusted to pH 4.0. This solution was applied to a column filled with 100 cc. of IR–120 resin (H type) at a flow rate of 1 cc./minute. After washing the column with one liter of distilled water, 0.5 N $NH_4OH$ was passed through it at the flow rate of 1 cc./minute. The passed solution of 100 cc. was neutralized with 1 N HCl and freeze-dried to yield a slightly yellowish powder of 1.6 g. having 9% purity. The yield was calculated to be 88.9%.

*Example 6*

A strain obtained from the strain M338–M1 by monospore culture was shake-cultured in a medium shown in Example 1 for 72 hours and one liter of the cultured broth was inoculated to 100 liters of medium containing soybean meal, 1.5%; maltose, 1.5%; NaCl, 0.3%; $MgSO_4 \cdot 7H_2O$, 0.1%; $K_2HPO_4$, 0.1%; $CuSO_4 \cdot 5H_2O$, 0.0007%; $MnCl_2 \cdot 4H_2O$, 0.0008%; $FeSO_4 \cdot 7H_2O$, 0.0001%; $ZnSO_4 \cdot 7H_2O$, 0.0002% pH 7.4 in a 200-liter fermenter and the fermentation was carried under aeration of 100 liters per minute and the agitation of 200 r.p.m. at 28° C. After 48 hours, it was inoculated to 1400 liters of the same medium placed in a 2000 liter fermenter and the fermentation was continued. Then after 48 hours the pH was 6.9 and 160 mcg./cc. of kasugamycin was produced and at 90 hours the pH was 7.2 and 530 mcg./cc. of kasugamycin was produced. This broth contained 8.4 mcg./cc. of aureothricin. The fermentation was stopped and the broth was filtered with the aid of diatomaceous earth. Including the water used for washing of the filter, totally 1570 liters of filtrate were obtained. Three hundred liters of IR–120 resin were converted to the H form and the amount of ammonia necessary to convert ¼ of the resin to the ammonium type was added to the resin which was further washed with water. The broth filtrate was passed through the column containing the resin described above. Then the first effluent of 610 liters contained no kasugamycin and the further effluent of 950 liters contained 65.2 g. of kasugamycin. This effluent was passed to another resin tower. The elution was made from the first resin, using 0.5 N $NH_4OH$. The first eluate of 53 liters contained 28.5 g. of kasugamycin. The second eluate of 200 liters contained 738 g. of kasugamycin. The third eluate of 200 liters contained 44.2 g. of kasugamycin. The eluate was neutralized with HCl to pH 6.6. The second eluate was concentrated under vacuum to 6.32 liters and 60 liters of ethanol was added. Then crude crystals of kasugamycin hydrochloride (850 g.; 90% purity) was obtained.

Included within the scope of the present invention are acid addition salts of kasugamycin with organic and inorganic acids such as hydrochloric acid, sulfuric acid, hydrobromic acid, hydriodic acid, phosphoric acid, nitric acid, citric acid, maleic acid, malic acid, tartaric acid, benzoic acid, cinnamic acid, ascorbic acid, acetic acid, picric acid, phytic acid, levopimaric-6,8a-cis-endosuccinic acid, sulfamic acid, glycolic acid and mandelic acid. For therapeutc purposes use is made of salts of nontoxic acids but salts of toxic acids, e.g. picric acid, are useful is isolation procedures, e.g. as precipitants from aqueous solutions, and for disinfectant purposes where toxicity is not important.

When desired for specific purposes and rendered pharmaceutically compatible, there may be admixed with the compounds of the present invention other medicaments such as antihistamines, sulfa drugs (e.g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4 - dimethylbenzoylsulfanilamide, benzylsulfanilamide and N'-2-(2-quinoxalyl) sulfanilamide), lipotropic agents (particularly methionine, choline, inositol and beta-sitosterol and mixtures thereof), stimulants of the central nervous system (e.g. caffeine, amphetamines), local anesthetics, analgesics (e.g. aspirin, salicylamide, sodium gentisate, p - acetylaminophenol, phenacetin, codeine), laxatives (e.g. phenolphthalein), sedatives (e.g. barbiturates, bromides), salts of penicillin (e.g. potassium penicillin G, procaine, penicillin G, 1-ephenamine penicillin G, dibenzylamine penicillin G, other salts disclosed by U.S. Patent 2,627,491; these combinations are particularly useful to enable variation of the pattern of blood levels obtained), phenoxymethylpenicillin and salts thereof, other antibiotic agents (e.g. streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cycloserine, neomycin; in some cases such combinations attack a wider range of organisms or show synergistic efficacy or provide decreased toxicity with equal efficacy), vitamins (e.g. vitamins A, $A_1$, $B_1$, $B_2$, $B_6$, $B_{12}$ and members of that family, folic acid and members of that family, vitamins C, $D_2$, $D_3$ and E), hormones (e.g. cortisone, hydrocortisone, 9-α-fluorocortisone, 9-α-fluorohydrocortisone, prednisone and prednisolone), anabolic agents (e.g. 11,17-dihydroxy-9-α-fluoro-17-α-methyl-4-androsten-3-one; 17-α-ethyl-19-nortestosterone) and antifungal agents (e.g. mycostatin).

We claim:
1. The process for the production of an antibiotic, designated kasugamycin, which comprises cultivating a strain of *Streptomyces kasugaensis* in an aqueous carbohydrate solution containing a nitrogenous nutrient under submerged aerobic conditions until substantial antibacterial activity is imparted to said solution and then recovering said kasugamycin from said solution.
2. The process of claim 1 in which the organism is *Streptomyces kasugaensis*, A.T.C.C. 15714.
3. The process of claim 1 in which the organism is *Streptomyces kasugaensis*, A.T.C.C. 15715.
4. The process of claim 1 wherein the antibiotic kasugamycin is recovered from an aqueous solution thereof by adsorption on carbon and subsequent elution.
5. The process of claim 1 wherein the antibiotic kasugamycin is recovered from an aqueous solution thereof by adsorption on a cation exchange resin and subsequent elution.
6. The process according to claim 5 wherein a cation resin having sulfonic acid as the active group is used for adsorption of kasugamycin.
7. A process according to claim 5 wherein ammonia is used for elution of the adsorbed antibiotic.
8. The compound kasugamycin of the formula

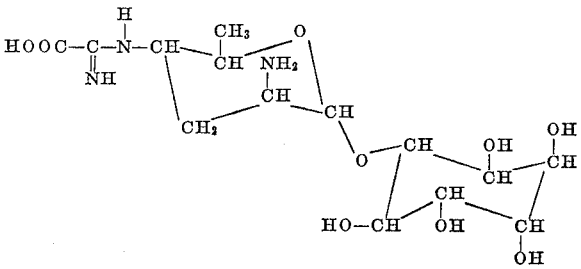

or acid addition salts thereof.
9. An acid addition salt of kasugamycin as defined in claim 8.
10. Kasugamycin hydrochloride as defined in claim 8.
11. Kasugamycin sulfate as defined in claim 8.

References Cited

Umezawa et al.: J. of Antibiotics, vol. 18, 1965, pages 101–103.

SAM ROSEN, *Primary Examiner*.